J. Reed.
Steering
Nº 6,507. Patented Jun. 5, 1849.
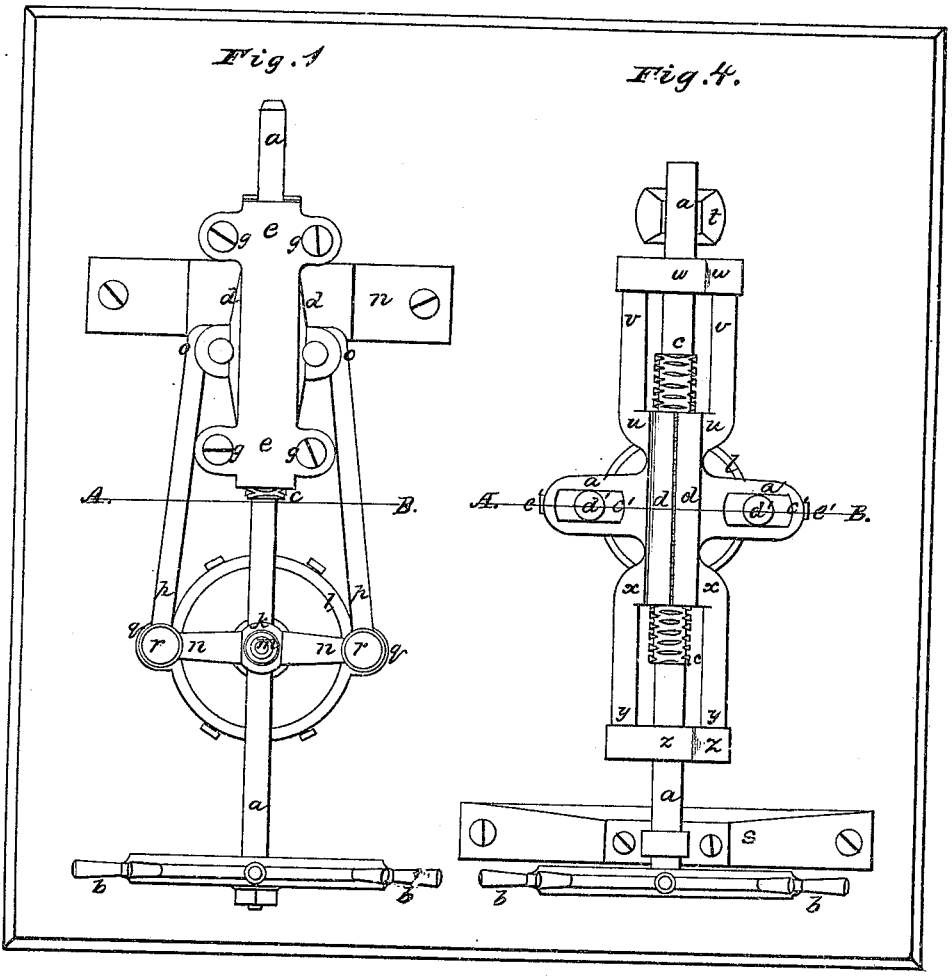
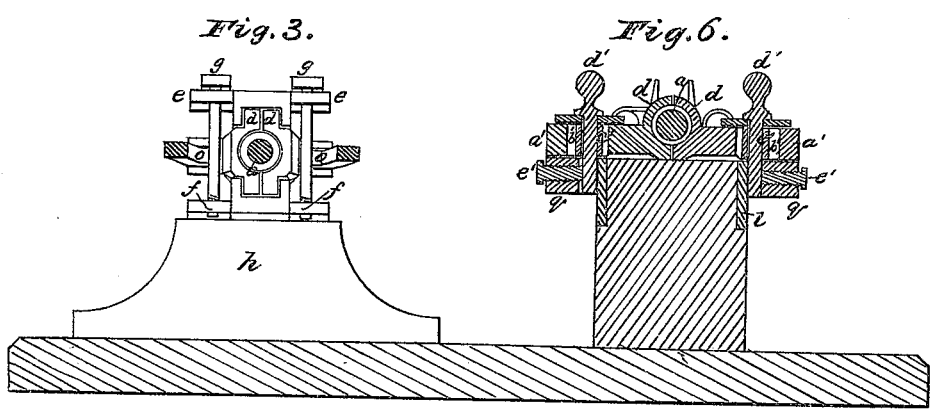

Sheet 2. 2 Sheets.

J. Reed.
Steering.

Nº 6,507.    Patented Jan. 5, 1849.

A.

B.

UNITED STATES PATENT OFFICE.

JESSE REED, OF MARSHFIELD, MASSACHUSETTS.

STEERING APPARATUS.

Specification of Letters Patent No. 6,507, dated June 5, 1849.

*To all whom it may concern:*

Be it known that I, JESSE REED, of Marshfield, in the county of Plymouth and State of Massachusetts, have invented certain new and useful Improvements in Steering-Wheels for Ships, &c., and that the following description, taken in connection with the accompanying drawings hereinafter referred to, forms a full and exact specification of the same, wherein I have set forth the nature and principles of my said invention by which it may be distinguished from others of a similar class, together with such parts as I claim and desire to have secured to me by Letters Patent.

The essential and distinguishing feature of my newly invented steering wheel, is a revolving right and left threaded screw working two half nuts on opposite sides of said screw, said nuts being connected to the two sides of the rudder head; and as the nuts move always in opposite directions on opposite sides of said revolving screw they both tend to give the rudder a rotary motion in the same direction. The manner or several modes in which I have made these devices or their combinations effect the turning of the rudder, are exhibited in the accompanying plate of drawings.

Figure 2:
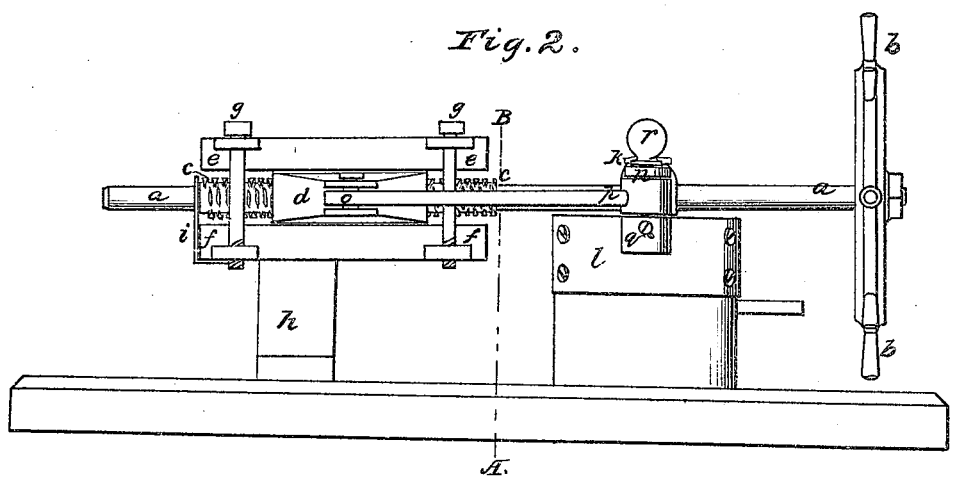
Figure 5:
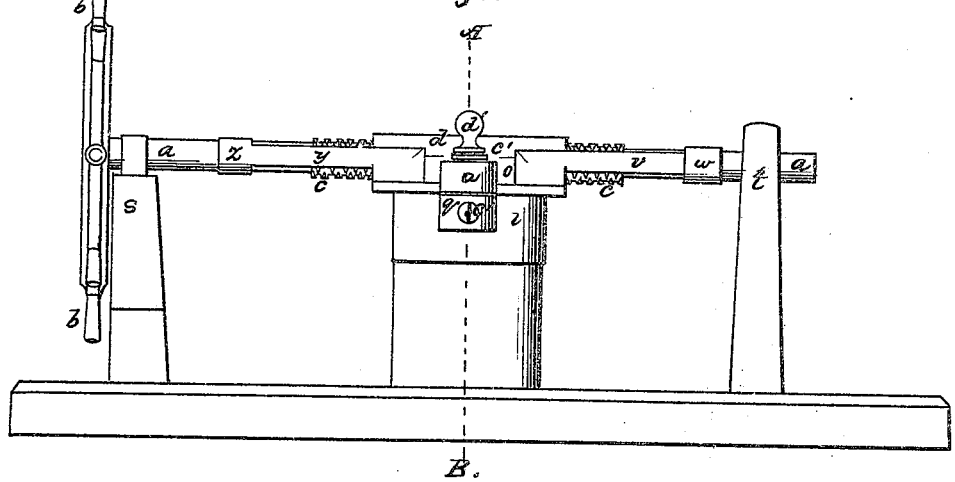

Figure 1 is a plan of one arrangement. Fig. 2 is a side elevation and Fig. 3 a vertical section taken in the plane of the line A, B, Figs. 4, 5, 6 are respectively a plan, side elevation and vertical section of another arrangement.

Where the parts are identically the same in the two arrangements, they are indicated by the same letters.

$a\ a$ is the horizontal turning shaft to the front end of which the vertical hand wheel $b\ b$ is attached in the ordinary way, and said shaft has formed upon it, of proper length a right and left threaded screw as shown at $c\ c$ in Figs 1, 2, 4 and 5. On each side of this screw and shaft as above suggested, is arranged an elongated nut, $d, d$ extending half-way round the shaft $a, a$, one nut having a right and the other a left threaded screw cut on its inner face, so as to work, properly and oppositely with the right and left threaded screw $c\ c$ on the shaft $a\ a$ in the usual way. In the arrangement shown in Figs. 1, 2, 3 the nuts $d, d$ slide forward and back, each in an opposite direction to the other, (when moved by the turning of the shaft $a\ a$ one way or the other) in proper grooves, formed in the upper and lower halves of the metallic frame $e\ e$—$f\ f$, as shown in Fig. 3. Said halves are connected together by the screws $g, g, g, g$, the lower one resting on the stanchion $h$, as shown in Figs. 1, 2 and 3.

The screw shaft $a\ a$ is supported at its rear end in a proper bearing in the projection $i$, (Fig. 2) from the lower half $f\ f$ of the metallic frame before referred to, while near its front end it passes through and rests in a bearing —$k$— arranged on the center of the top of the rudder head —$l$— so as to turn horizontally sufficiently to allow for the turning of the rudder post, and for this purpose said bearing, (at its bottom) rests and turns in a proper step in the top of the rudder head and on a pin $m$ Fig. 1, passing through the cross bar $n\ n$ into the top of said bearing.

The sliding nuts $d, d$, in the arrangement shown in Figs. 1, 2, and 3 are connected to the rudder head so as to turn, as before suggested, by means of the arms $o\ p$—$o\ p$, the ends $o, o$ of which are jointed (so as to turn freely), to the outside of the nuts $d, d$, while the ends $p, p$ are similarly connected to projections $q, q$ from each side of said rudder head; the vertical pins $r, r$ on which these ends $p, p$ turn, passing through proper holes in them, and in the ends of the cross bar $n\ n$, and in said projections $q, q$. In the arrangement shown in Figs. 4, 5 and 6 the shaft $a\ a$ has a front bearing on the top of the stanchion $s$ and a rear bearing in the stanchion $t$ the rudder head $l$ being between the two. The nuts $d, d$ play on the top of the rudder head, in opposite directions as in the first described arrangement, and at each end of each nut, a metallic frame $u\ v\ w$—$u\ v\ w\ x\ y\ z$—$x\ y\ z$ is attached each having three sides $u\ v\ w\ x, y, z$. Two of these frames extend toward the front of the shaft and two toward the rear, and the sides $w, w$, $z, z$, are bent so as to clasp the shaft $a\ a$ and act as guides for the same.

The nuts $d, d$ in this arrangement, are connected to the projections $q, q$ from the rudder head $l$, as follows:— A wide metallic arm $a', a'$, projects at right angles from each nut $d, d$ as shown in Figs. 4, 5, 6, over the projections $q, q$ from the rudder head. A slot $b', b'$, is formed in each of these arms, and in these slots, a sliding button $c', c'$ is inserted so as to move to or from the nuts, as the case may require. The vertical pins $d'$, $d'$ pass through proper holes in these buttons, and in the projections $q$, $q$. This arrangement of the arms $a'$, $a'$ with the sliding buttons $c'$ $c'$ gives free play to all the moving parts and turns the rudder post substantially in the same manner as in the first described arrangement. The vertical pins $r$ $r$ and $d'$ $d'$, are prevented from moving upward by the confining screws $e'$, $e'$, $e'$ &c., arranged as shown in the several figures.

The advantages attained by this mode of construction are four fold: the first and most important of which is, that by it I overcome all tendency to bend the screw, which is found so prejudicial in all the other apparatus for similar purpose, as the strain in both directions in my apparatus is at the same point, on opposite sides of the screw; and the half nuts being long and fitting together, serve to sustain and stiffen the screw, the guides aiding therein. Secondly, by screwing the guides together tightly, I can increase the friction sufficiently to guard against the shocks of the sea in rough weather. Thirdly, I have the advantage of occupying a much smaller space than in ordinary apparatus, with right and left screws; and fourthly, the working parts can be kept much better lubricated by the combination of threads crossing each other, and the two half nuts working together; and by these united advantages I combine great strength, economy, and compactness with thorough efficiency and beauty of construction.

Having thus described my improved steering wheel I shall state my claim as follows:

What I claim as my invention and desire to have secured to me by Letters Patent is—

The combination of a right and left threaded screw, on the hand wheel shaft $a$ $a$, with two half nuts $d$, $d$, arranged, one, on each side of said screw and traversing in guides, opposite to each other, as herein above set forth. Said nuts being connected to the rudder head either by the long arms $o$ $p$—$o$ $p$ as in the first described arrangement or as in the second by the slotted arms $a'$, $a'$ and sliding buttons $c'$, $c'$, all arranged and operating substantially as herein above set forth.

JESSE REED.

Witnesses:
 EZRA LINCOLN, Sr.,
 LUTHER BRIGGS, Jr.